United States Patent
Rothbauer et al.

(10) Patent No.: US 8,677,974 B2
(45) Date of Patent: Mar. 25, 2014

(54) PISTON BOWL WITH FLAT BOTTOM

(75) Inventors: Rainer J. Rothbauer, San Antonio, TX (US); Charles E. Roberts, Jr., Helotes, TX (US); Chad H. Stovell, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 964 days.

(21) Appl. No.: 12/773,344

(22) Filed: May 4, 2010

(65) Prior Publication Data
US 2011/0271931 A1 Nov. 10, 2011

(51) Int. Cl.
*F02B 23/06* (2006.01)

(52) U.S. Cl.
USPC .......................................................... 123/298

(58) Field of Classification Search
USPC ................. 123/276, 279, 294, 298, 299, 300, 123/193.6
See application file for complete search history.

(56) References Cited

U.S. PATENT DOCUMENTS

| | | | |
|---|---|---|---|
| 2,231,392 A | 2/1941 | McCarthy | |
| 2,762,348 A | 9/1956 | Meurer | |
| 2,942,591 A | 6/1960 | Meurer | |
| 3,039,445 A | 6/1962 | Crowther et al. | |
| 2,766,738 A | 10/1965 | Hoffmann | |
| 4,221,190 A | 9/1980 | Komiyama et al. | |
| 4,274,375 A | 6/1981 | Küpper et al. | |
| 4,281,629 A | 8/1981 | List | |
| 4,311,122 A | 1/1982 | Banba et al. | |
| 4,770,138 A * | 9/1988 | Onishi | 123/276 |
| 4,779,587 A | 10/1988 | Schweinzer et al. | |
| 4,942,804 A * | 7/1990 | Matsuura et al. | 123/279 |
| 5,065,715 A | 11/1991 | Evans | |
| 5,103,784 A | 4/1992 | Evans | |
| 5,121,722 A | 6/1992 | Horiuchi | |
| 5,136,994 A | 8/1992 | Gale | |
| 5,215,052 A | 6/1993 | Augustin | |
| 5,224,449 A | 7/1993 | Fukano et al. | |
| 5,329,901 A | 7/1994 | Onishi | |
| 5,357,924 A | 10/1994 | Onishi | |
| 5,535,716 A * | 7/1996 | Sato et al. | 123/279 |
| 5,873,344 A | 2/1999 | Kudou et al. | |
| 6,237,579 B1 | 5/2001 | Singh | |

(Continued)

FOREIGN PATENT DOCUMENTS

JP 2004190572 A 7/2004

OTHER PUBLICATIONS

U.S. Office Action, mailing date Aug. 23, 2012 issued in U.S. Appl. No. 12/767,531 (8 pgs).

(Continued)

*Primary Examiner* — Stephen K Cronin
*Assistant Examiner* — Arnold Castro
(74) *Attorney, Agent, or Firm* — Grossman, Tucker et al.

(57) ABSTRACT

A piston for a direct injection engine is provided, the piston having a bowl at an upper end, the bowl forming a portion of a combustion chamber. The bowl includes an inner surface that defines a volume configured to receive a fuel-air mixture, the inner surface of the bowl including a generally concave portion including a flat bottom surrounding a central protruding dome. The relatively flat bottom portion is bounded by two radial concave surface portions which are disposed below two convex separation features for the injected fuel spray. Such surface geometries may reduce soot and improve fuel-air mixing.

10 Claims, 10 Drawing Sheets

(56) References Cited

U.S. PATENT DOCUMENTS

| | | | |
|---|---|---|---|
| 6,336,437 | B1 | 1/2002 | Baika et al. |
| 6,601,561 | B1 | 8/2003 | Liu et al. |
| 6,651,612 | B2 | 11/2003 | Kobayashi |
| 6,701,875 | B2 | 3/2004 | Weng et al. |
| 6,708,666 | B2 | 3/2004 | Roberts, Jr. |
| 6,739,308 | B1 | 5/2004 | Curtis |
| 6,892,689 | B2 | 5/2005 | Bischofberger et al. |
| 6,955,165 | B2 | 10/2005 | Liu |
| 6,997,158 | B1 | 2/2006 | Liu |
| 7,096,848 | B2 | 8/2006 | Ono et al. |
| 7,131,418 | B2 | 11/2006 | Wieland |
| 7,185,614 | B2 | 3/2007 | Meffert et al. |
| 7,318,406 | B2 | 1/2008 | Yi et al. |
| 7,441,535 | B2 | 10/2008 | Yuzaki et al. |
| 8,424,506 | B2 | 4/2013 | Hasegawa |
| 8,459,229 | B2 | 6/2013 | Rothbauer et al. |
| 2003/0066507 | A1 | 4/2003 | Roberts, Jr. |
| 2003/0217732 | A1 | 11/2003 | Kataoka et al. |
| 2006/0090726 | A1 | 5/2006 | Meffert et al. |
| 2006/0201143 | A1 | 9/2006 | Jacobsson et al. |
| 2007/0163535 | A1 | 7/2007 | Walter |
| 2009/0188481 | A1 | 7/2009 | Zhu et al. |
| 2009/0205607 | A1 | 8/2009 | Levy |
| 2010/0206263 | A1 | 8/2010 | Hasegawa |
| 2010/0258076 | A1 | 10/2010 | Eismark et al. |
| 2011/0146613 | A1 | 6/2011 | Oxborrow et al. |
| 2011/0253094 | A1 | 10/2011 | Rothbauer et al. |
| 2011/0253095 | A1 | 10/2011 | Rothbauer et al. |
| 2011/0259297 | A1 | 10/2011 | Rothbauer et al. |
| 2011/0271931 | A1 * | 11/2011 | Rothbauer et al. ............ 123/279 |

OTHER PUBLICATIONS

U.S. Office Action, mailing date Sep. 20, 2012 issued in U.S. Appl. No. 12/763,468 (5 pgs).

U.S. Office Action, mailing date Mar. 5, 2013 issued in U.S. Appl. No. 12/767,531 (6 pgs).

U.S. Office Action, mailing date Sep. 16, 2013 issued in U.S. Appl. No. 12/763,484 (11 pgs).

* cited by examiner

PISTON BOWL WITH FLAT BOTTOM

FIELD OF THE INVENTION

The present disclosure relates to a piston and an associated method of utilizing the piston within a direct injection engine wherein the bowl of the piston includes a separation feature and a flat bottom which may act upon the injected fuel spray. The separation feature may divide and guide the fuel jets into upper and lower regions of the bowl which may improve the distribution of fuel along with an effect on combustion rates and soot emissions.

BACKGROUND

Modern day engines must meet ever-more stringent emission regulations while remaining as fuel efficient as possible. Such engines may be designed to meet extremely strict NOx and particulate matter regulations. The use of high levels of exhaust gas recirculation (EGR) to reduce NOx emissions may have an unfortunate side effect of increasing the emission of particulate matter (PM) or soot. There may be multiple approaches to achieve the emission targets and to reduce the particulate matter to levels which current after-treatment systems may be able to tolerate, each approach having its own advantages and disadvantages. Besides strategies like high injection pressure and late injection timing, after-treatment systems may be used to reduce both the NOx and particulate matter, but at a relatively higher initial coast for the engine/after-treatment system. This higher cost and complexity may result in a potential benefit for an in-cylinder emission reduction solution.

To meet the goals of reduced emissions and fuel efficiency, combustion chamber design may provide an opportunity to improve burn rate and fuel consumption while improving the fuel-air mixing rate so that particulate emissions may be reduced. High injection pressure systems may provide not only small droplets and more oxygen entrainment in the fuel/air mixture, but also may provide high momentum jets of fuel, which may be used to distribute the fuel to oxygen-rich regions within the combustion chamber.

Traditional combustion system development has concentrated on axial symmetric bowl shapes having a curved or rounded floor portion extending circumferentially around the piston bowl. The traditional piston bowl shape may serve as a starting point for improvement, however, these shapes generally include curved surfaces.

SUMMARY

A piston for a direct injection engine, the piston comprising a bowl at an upper end, the bowl forming a portion of a combustion chamber, wherein the bowl has an inner surface that defines a volume configured to receive a fuel-air mixture. The inner surface of the bowl includes a flat bottom portion surrounding a central protruding dome, wherein the flat bottom portion is bounded by two radial concave surface portions which are disposed below two convex separation features for an injected fuel spray. The flat bottom portion may have a radius of equal to or greater than 1.0 meters.

In method form, the present disclosure is directed at a method of operating an internal combustion engine having at least one cylinder and a piston slidably disposed within the at least one cylinder. The method comprises moving the piston toward a top dead center position during a compression stroke and spraying a fuel and air mixture into a piston bowl recessed in said piston, wherein the bowl has an inner surface that defines a volume configured to receive the fuel-air mixture, the inner surface of the bowl including a flat bottom portion surrounding a central protruding dome, wherein the flat bottom portion is bounded by two radial concave surface portions which are disposed below two convex separation features for an injected fuel spray. One of said two convex separation features redirects said fuel-air mixture upon impact to provide additional fuel-air mixing.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Various features of the present invention will now become readily apparent to those skilled in the art from the following detailed description, wherein the invention is shown along with certain preferred embodiments. As will be realized the invention is capable of other and different embodiments, and its several details are capable of modification in various respects. Accordingly, the description is to be regarded as illustrative in nature and not as restrictive.

Today's high pressure injection systems for engines deliver a large amount of kinetic energy which can now be utilized to form a favorable distribution of fuel in the combustion chamber which may be applicable for diesel engines. The distribution of the mixture may now be influenced by the geometry of the spray impact zone along the inner surfaces of the piston bowl thus affecting the formation of emissions as well as heat release. In this disclosure, fuel-jet/bowl-wall interaction is employed to improve combustion characteristics. The bowl shapes may include a protruding nose feature and a flat-bottomed geometry on and/or around the bottom surface of the bowl to enhance performance. As noted above, the deflection and separation geometries within the piston bowl may now improve the distribution of fuel along with an effect on soot formation and combustion. For example, soot may be reduced as compared to those pistons that do not incorporate the geometries noted herein.

While the disclosure is now discussed primarily with respect to diesel engines, it is contemplated that the features of the invention would be applicable to any engine using direct injection of fuel, for instance, gasoline or natural gas. Reference to direct injection of fuel may be understood as the injection of fuel into a cylinder containing a piston where the fuel is ignited to provide piston movement.

Computational Fluid Dynamic (CFD) modeling was used to identify the various piston bowl geometries formed in the surface of a piston bowl which may now be used to enhance fuel jet separation from the bowl and improve fuel-air mixing. This then may enhance the rate of combustion while reducing particulate emissions (soot). Measurement studies utilized a complete piston bowl geometry containing the identified surface geometries.

Figure 1:
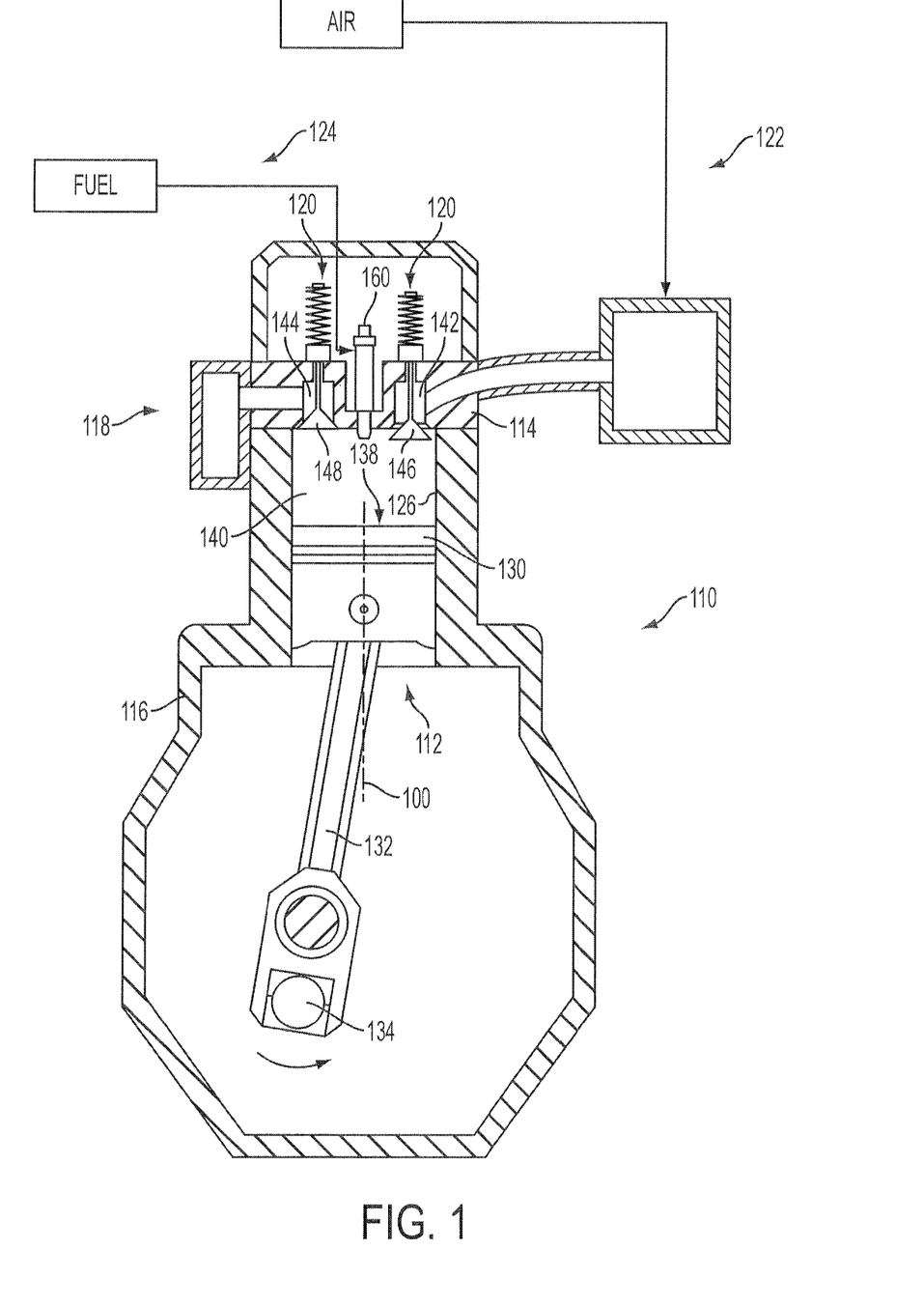
FIG. 1 is a schematic illustration of an exemplary internal combustion engine.

For reference purposes, FIG. 1 is a schematic illustration of an exemplary internal combustion engine showing one of a plurality of cylinders in sectional view. Such an internal combustion engine 110 may include a plurality of piston assemblies 112 and a cylinder head 114 associated with each piston assembly surrounded by an engine block 116, an exhaust system 118, a valve actuation system 120, an air induction system 122 and a fuel supply system 124. The piston assembly 112 may be slidably disposed within a cylinder 126. Piston assembly 112 may include a piston 130 pivotally connected to a connecting rod 132, which is pivotally connected to a crankshaft 134. A rotation of the crankshaft 134 may result in a sliding motion of piston 130 within the cylinder 126. The cylinder head 114 and end of the piston 130 form a combustion chamber 140. The combustion chamber 140 may include an intake port 142 and an exhaust port 144 and intake valve 146 and exhaust valve 148 disposed within the respective ports. At least one fuel injector 160 may be disposed within the cylinder head 114 to inject fuel into the combustion chamber at a predetermined time. Such injector may be located on the centerline 100 of the cylinder head (as shown) or may be offset from such centerline. The face 138 of piston 130 may surround a curved surface against which combustion gases may exert pressure to drive the piston downward. In the present disclosure, this curved surface may be a generally annular concave recess or bowl 150 as shown in FIG. 2.

Figure 2:
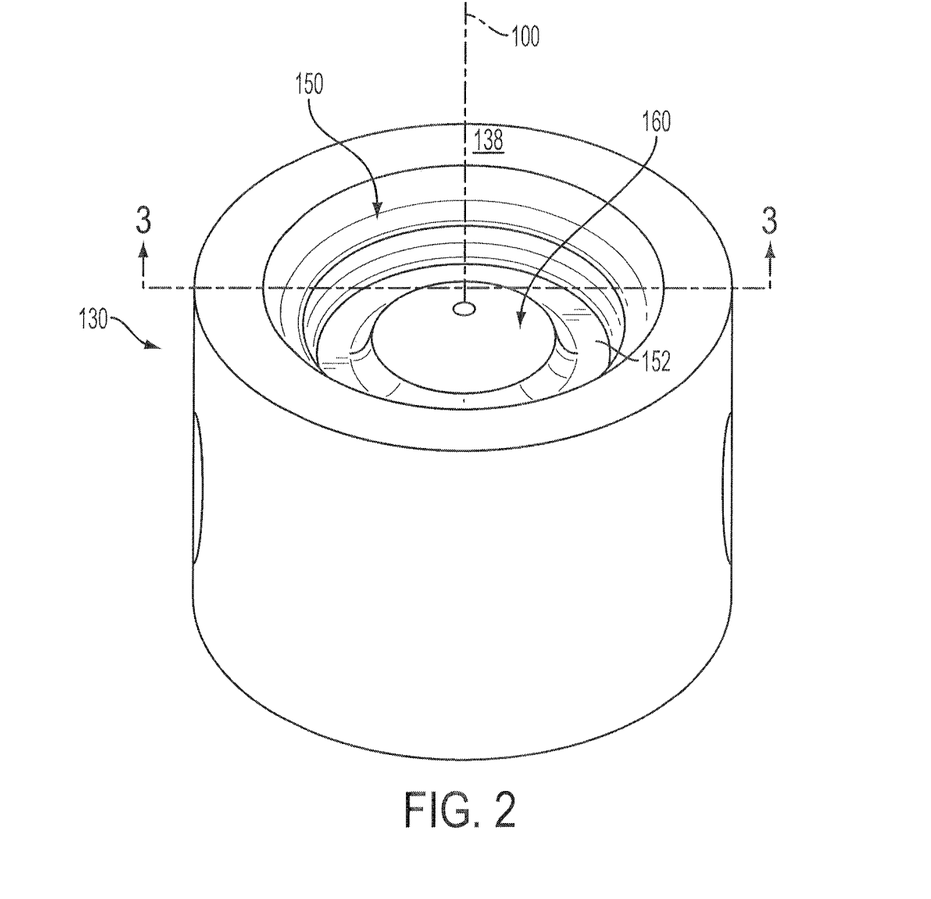
FIG. 2 is a perspective view of the piston of FIG. 1 showing an exemplary bowl shape.

FIG. 2 is a perspective view of the piston 130 of FIG. 1 showing an exemplary bowl 150 which includes a dome 160 forming a relatively uniform concentric surface angled downward from a central axis 100, the dome surrounded by a flat floor portion 152. The piston 130 has an upper peripheral face 138 from which the bowl 150 descends.

A "flat surface" as used herein refers to a surface or portion of a surface that has a radius of curvature of greater than or equal to 1.0 meter.

It is further contemplated that the flat surface 152 that forms the bottom of the bowl may be tipped relative to the central axis 100 by an angle of 65° to 115° in increments of 0.5°, such as 65.5°, 66.0°, 66.5° etc. That is, the radial component of the surface may still be flat but tipped at an angle and the axial component of the surface may be curved.

Figure 3:
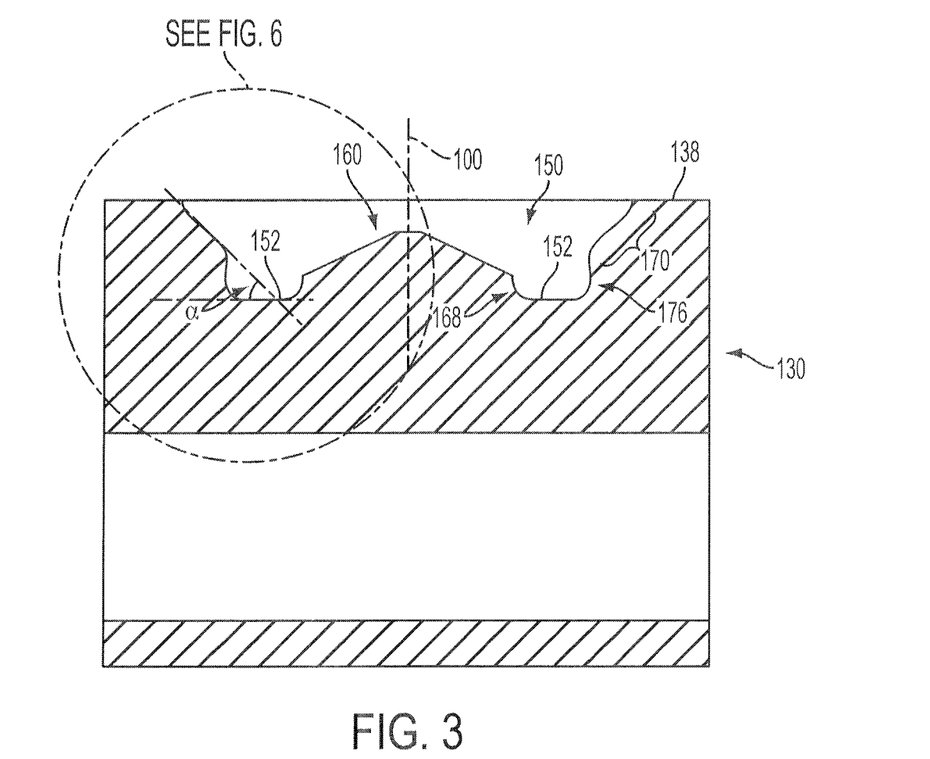
FIG. 3 is a cross-sectional view taken vertically through the center of the exemplary piston of FIG. 2 along line 3-3.

FIG. 3 is a cross-sectional view taken vertically through the center of the exemplary piston of FIG. 2 along line 3-3 and illustrates that the flat floor portion 152 is bounded by an outer concave portion 176 and an inner concave portion 168 that form the lower region of the bowl, above which is disposed surface feature 170 that may act as a step or nose to separate the fuel-air jets.

Figure 4:
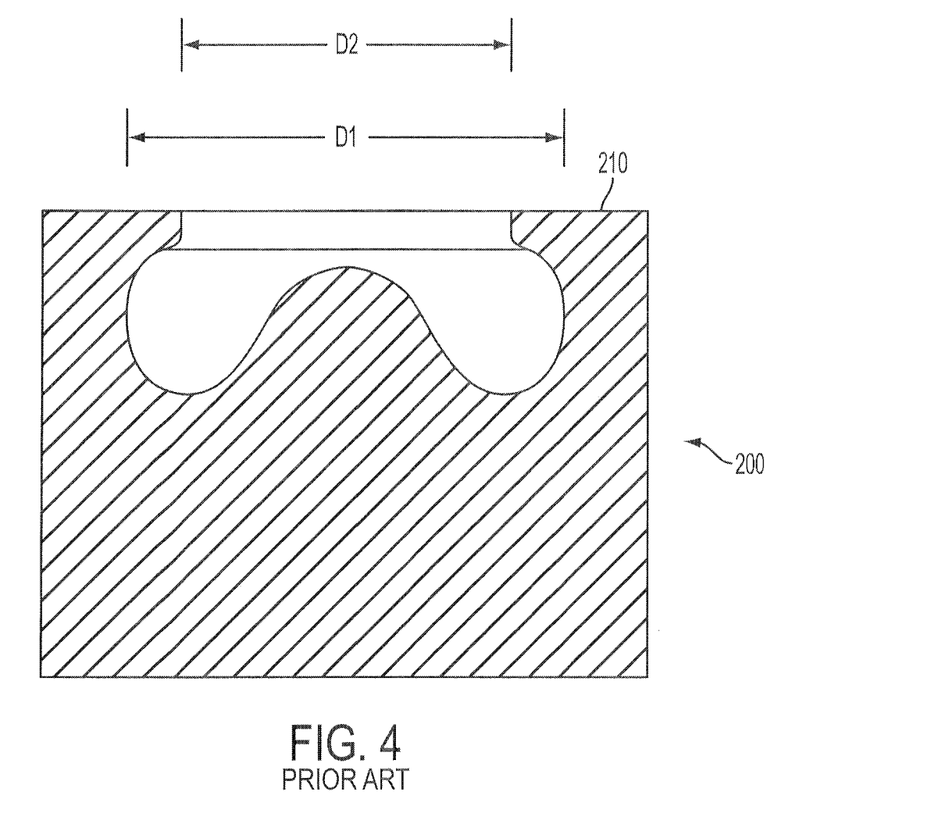
FIG. 4 is a cross-sectional view taken vertically through the center of a piston in the prior art.

FIG. 4 is a cross-sectional view of a prior art piston bowl 200 having an axial symmetric geometry. Note that the diameter of the concave bowl at its greatest point D1 is significantly greater than the inner diameter D2 of the top face 210 and that there are no convex features associated with the wall of the bowl.

Figure 6:
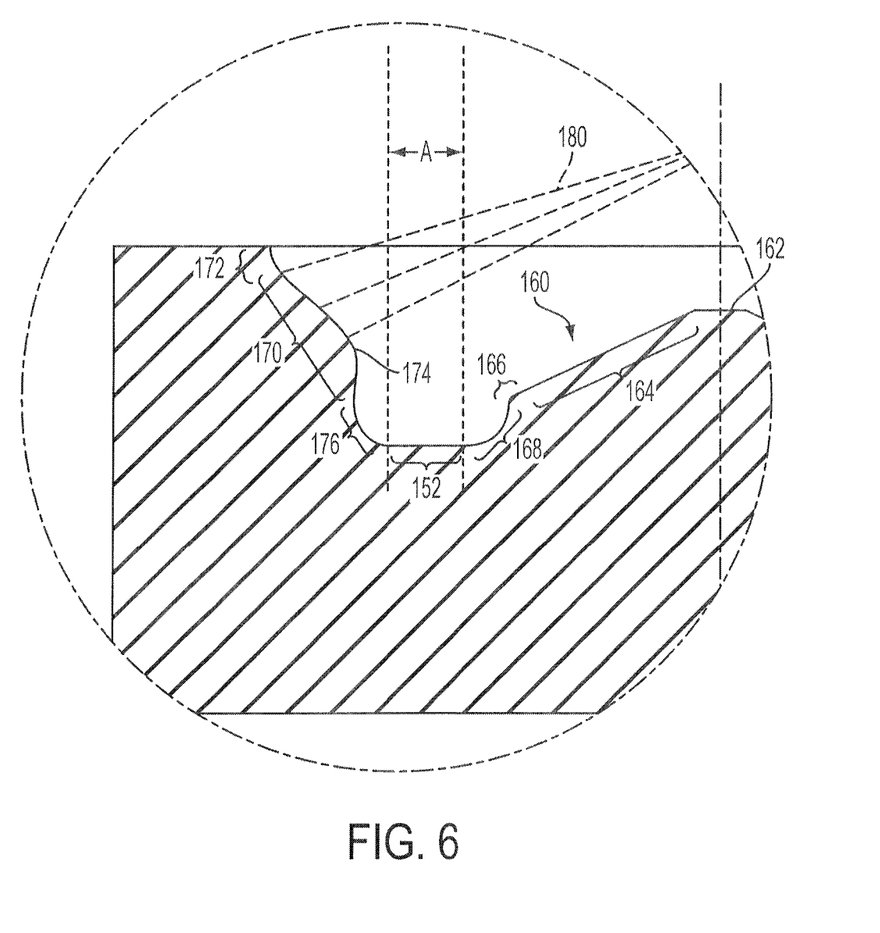
FIG. 6 is an enlarged view of the circled area of the piston of FIG. 3 illustrating the separation feature and flat bottom of the bowl.

FIG. 6 is an enlarged view of the circled area of the piston 130 of FIG. 3 further illustrating the separation feature 170 and flat bottom 152 of the bowl. Injected fuel 180 may be directed at angled surface 170 which includes a nose or step feature 174 which is intended to separate fuel-air jets. The angled surface 170 may be disposed at an angle α (see FIG. 3) to the flat bottom of the bowl 152 of between 15° and 75° in 1° increments, such as 15°, 16°, 17°, etc. Note that the angled surface 170 lies below and inboard of the upper peripheral face 138 of the piston 130.

The separation feature 170 may divide and guide the fuel jets into upper and lower regions of the combustion chamber, that is a region above the edge of the piston bowl (not shown) and a region encompassed by 168, 152 and 176. Such separation may improve the distribution of fuel along with an effect on combustion rates and soot emissions.

Figure 5:
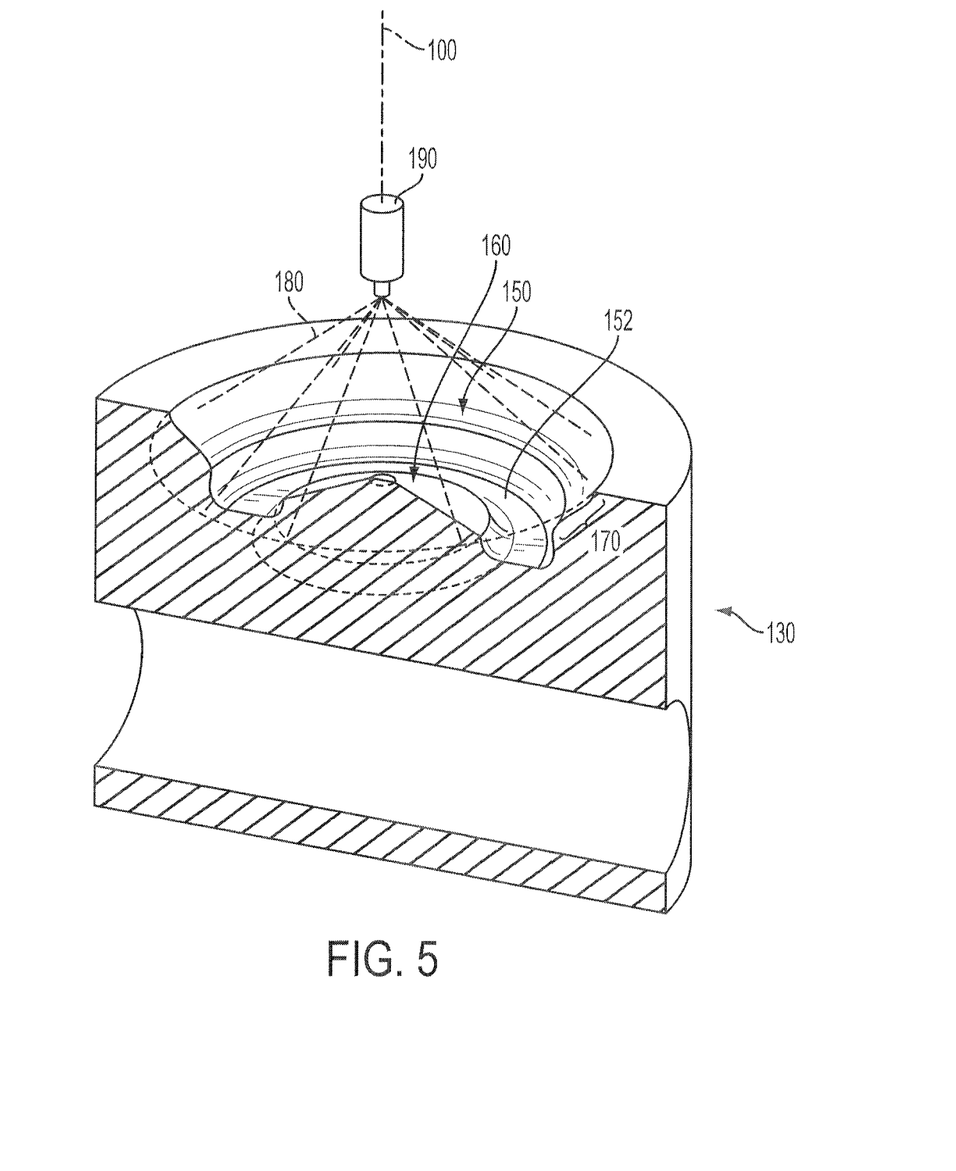
FIG. 5 illustrates a perspective view of a section of the bowl of FIG. 2 further including a central injector and an exemplary conical spray pattern of fuel.

As illustrated in FIG. 5, a spray pattern 180 of fuel may be in the shape of a cone radiating from an injector 190 mounted at the centerline 100 of the piston 130 directed at surface feature 170 arranged around the inside surface of the bowl 150. In this view, the remainder of the bowl is shown in wire-frame to assist in understanding the invention.

Following the path of the injected fuel 180, the spray that is deflected from the separation feature 170 into the lower region of the bowl encounters a first turning feature 176 that may guide the fuel-air jet back towards air nearer the centerline 100 of the bowl 150. The radius 176 is large enough to maintain jet momentum without separating the flow from the wall of the bowl in this area, for instance between 3 and 50 mm in 0.5 mm increments, for instance, 3.0 mm, 3.5 mm, 4.0 mm, etc.

The flat surface 152 that makes up the bottom of the bowl 150 may have a width A (before turning upwards as in turning features 176 and 168) of between 2% and 30% of the diameter of the piston. The flat surface 152 surrounds the dome 160 forming the bottom of the bowl 150. The flat surface 152 may guide the fuel-air jet towards the bowl feature 168. Concave radius 168 is disposed inboard of surface 152 and serves as a bowl exit feature that uses the radius to maintain fuel-air jet momentum as it approaches separation feature 166. Concave radius 168 may have a radius of between 3 and 50 mm in 0.5 mm increments, for instance, 3.0 mm, 3.5 mm, 4.0 mm, etc.

Convex radius 166 which promotes jet separation from the wall of the bowl has a radius of about 0.05 mm to 3.0 mm, in 0.05 mm increments, that is 0.05 mm, 0.1 mm, 0.15 mm, etc. and is disposed above concave radius 168.

It should be noted that the dome 160 of the bowl 150 has a relatively uniform surface 164 angled downward from the top 162 of the dome. This angle further aids separation of the fuel-air jets. The angle of the surface 164 to the vertical centerline of the piston may be between 90° and 140°, in 0.5° increments, for instance 90°, 90.5°, 91.0°, etc.

The piston bowl 130 of the present disclosure is characterized by having a flat bottom portion 152 bounded by two radial concave surface turning features 168, 176 which are disposed below two convex separation features 166, 170 for the injected spray 180. This combination of surface geometries may improve the mixing rate and guide the plume of fuel and air resulting in an improved burn rate as well as a reduction in particulate emissions. The combination of select radii and flat section within the bowl serve to conserve momentum and improve fuel jet motion so that adequate momentum is retained for separation of the fuel-air plume, late in combustion, when the flame exits the piston bottom area. Further, the angle and design of the separation feature 170 may insure adequate separation of the fuel-air jet from the bowl without steering the jet to re-entrain with the main injection event.

Finally, the presence of the flat bottom at the floor of the bowl may provide a reduced height for the piston, as well as reducing engine height, weight and friction.

Figure 7:
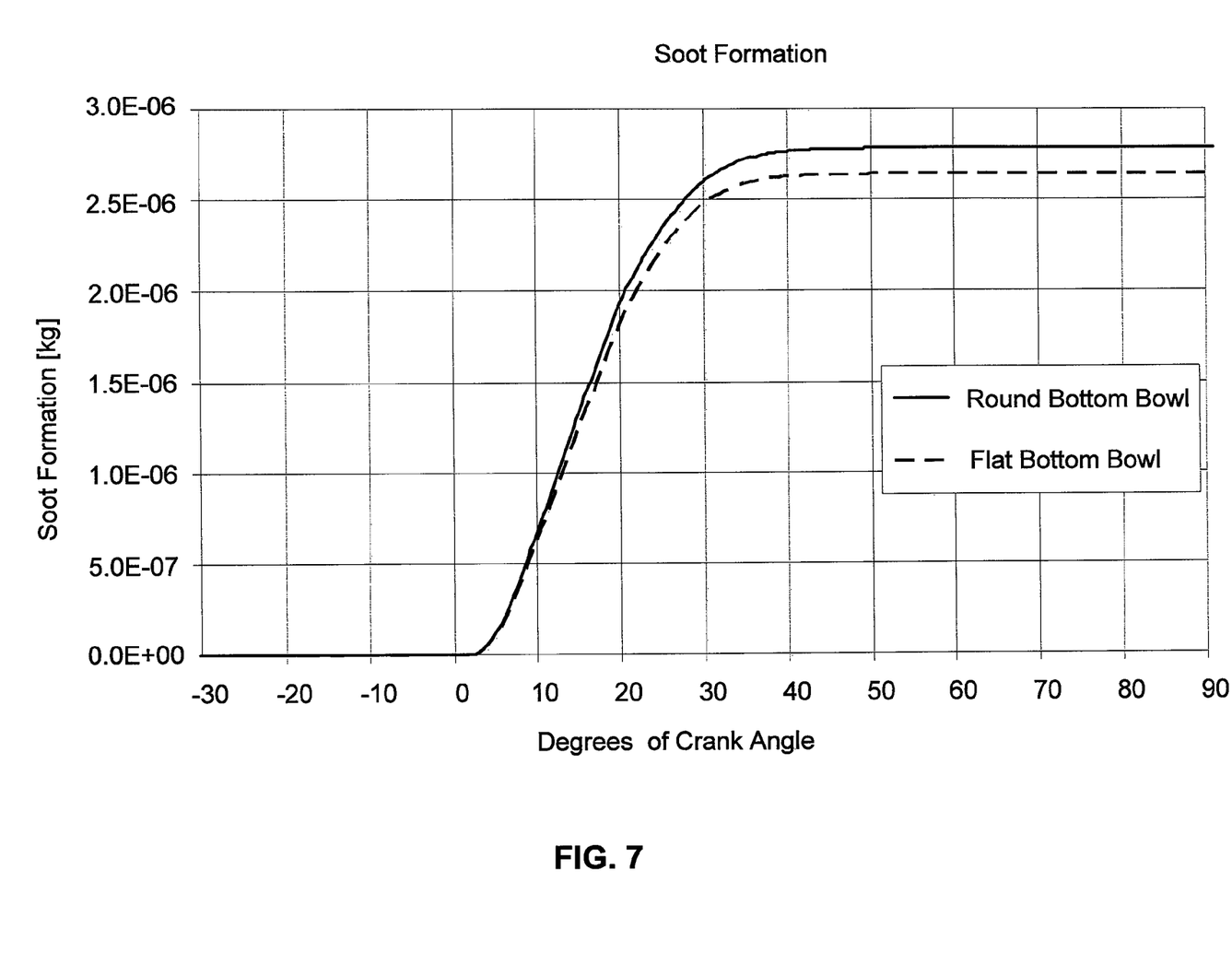
FIG. 7 is a plot of soot formation as a function of crank angle for two different bowl shapes according to the present disclosure.

FIG. 7 is a plot of soot formation as a function of crank angle for two different bowl shapes indicating that for crank angles of 20-90°, the amount of soot formation is less for the flat-bottomed bowl of the present disclosure when compared to a curved bottom bowl.

Figure 8:
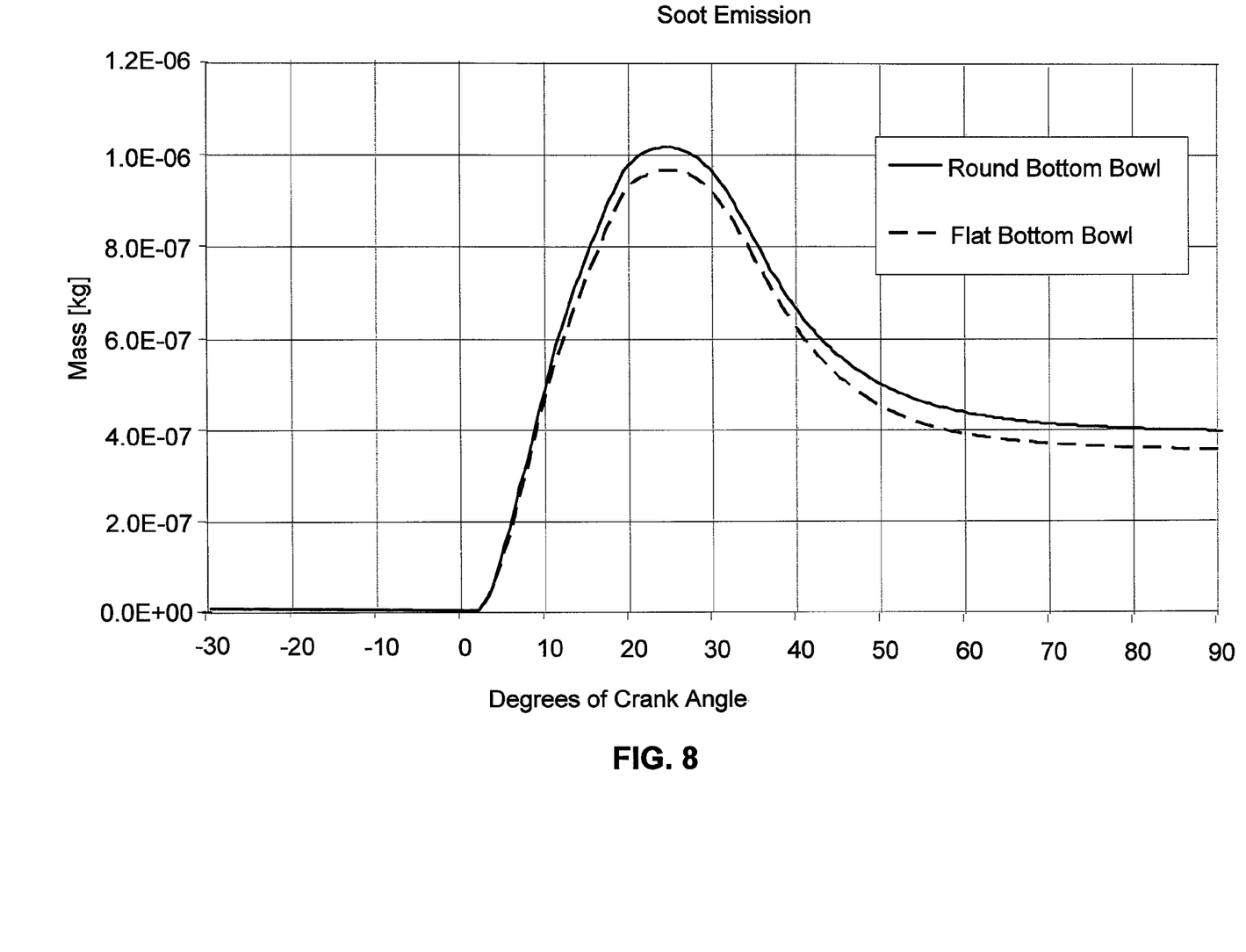
FIG. 8 is a plot of soot emission as a function of crank angle for two different bowl shapes according to the present disclosure.

FIG. 8 is a plot of soot emissions as a function of crank angle for two different bowl shapes indicating that for crank angles of 20-90°, the amount of soot emissions are less for the flat-bottomed bowl of the present disclosure when compared to a curved bottom bowl.

Figure 9:
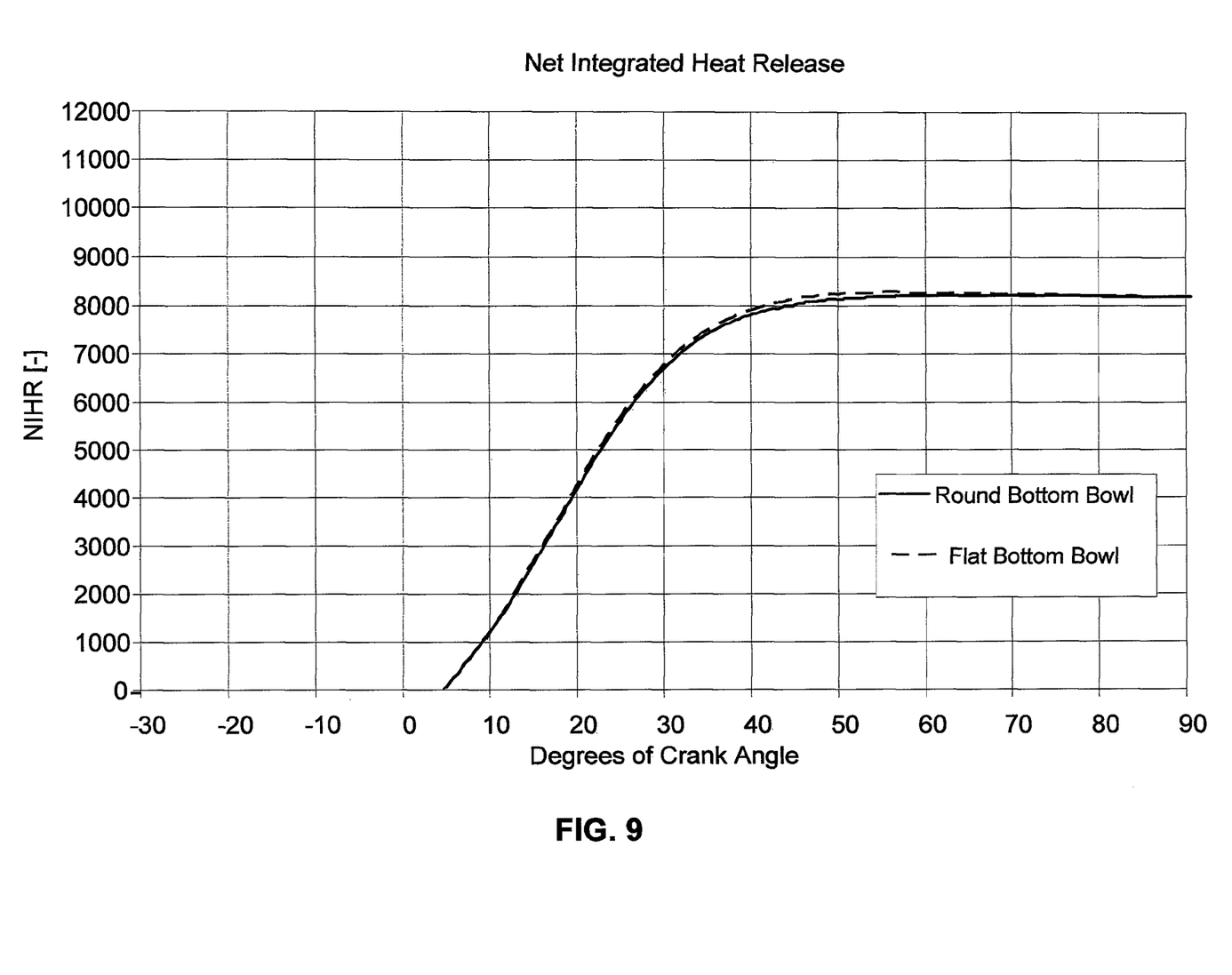
FIG. 9 is a plot of net integrated heat release versus crank angle.

FIG. 9 is a plot of net integrated heat release versus crank angle for a flat bottom bowl of the present disclosure compared to a curved bottom bowl. Although the difference may appear relatively small, it has been nonetheless found to be significant with respect to engine design.

Figure 10:
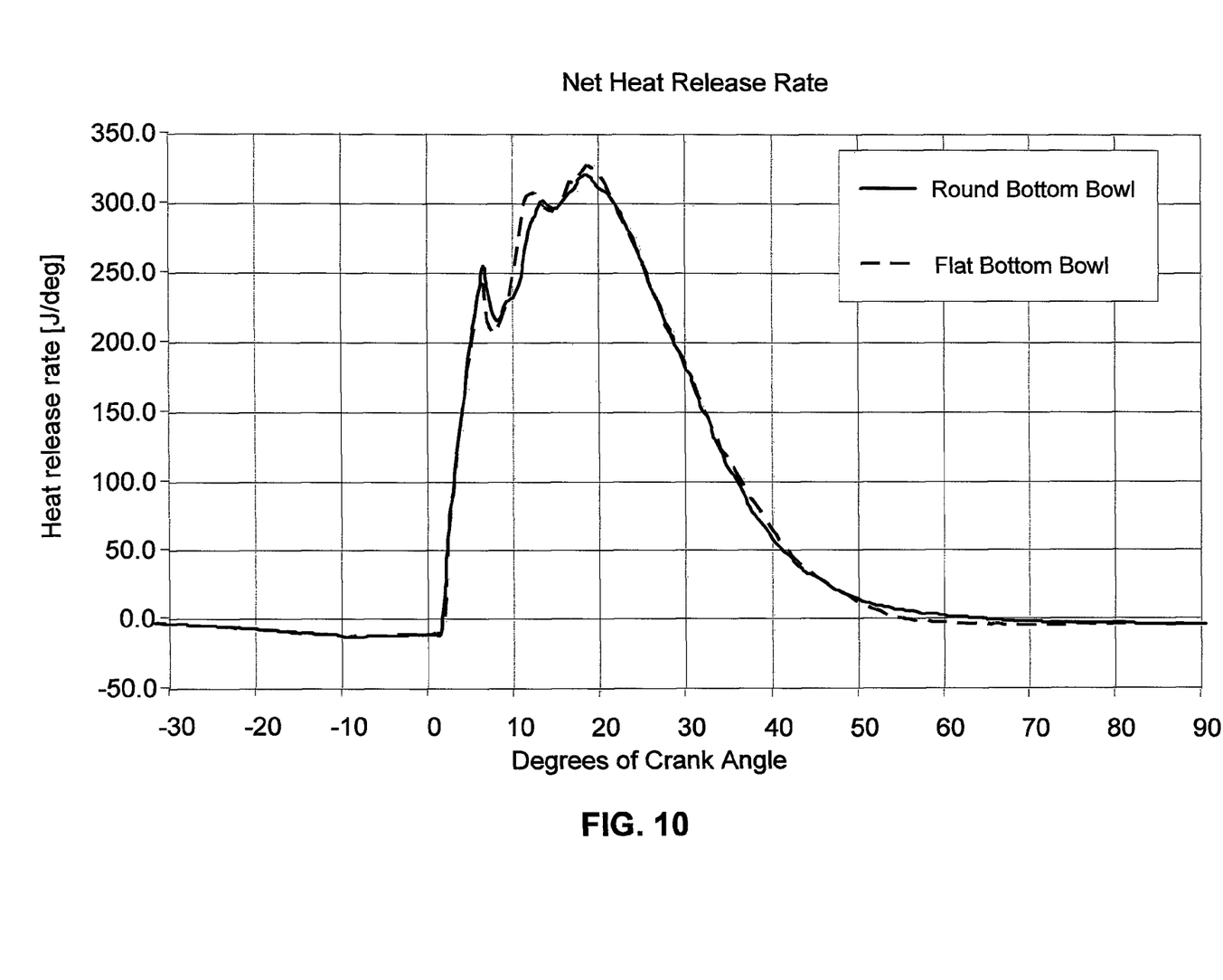
FIG. 10 is a plot of heat release rate (J/deg) versus crank angle.

FIG. 10 is a plot of heat release rate (J/deg) versus crank angle for a flat bottom bowl of the present disclosure compared to a curved bottom bowl. Although the difference may again appear relatively small, it confirms that more fuel is burned and there is a relatively higher heat release at an earlier time in the cycle for a flat bottom bowl versus a curved bottom bowl.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A piston for a direct injection engine, the piston comprising a bowl at an upper end, the bowl forming a portion of a combustion chamber, wherein the bowl has an inner surface that defines a volume configured to receive a fuel-air mixture, the inner surface of the bowl including a flat bottom portion surrounding a central protruding dome, the flat bottom portion having a radius of curvature of equal to or greater than 1.0 meter, wherein the flat bottom portion is bounded by two radial concave surface portions which are disposed below two convex separation features for an injected fuel spray, wherein one of said two convex separation features protrudes inwardly into the bowl, wherein said one of said two convex separation features that protrudes inwardly from a circumferential wall of the bowl is arranged to separate the injected fuel spray into an upper and a lower region in the combustion chamber, and wherein the piston has an upper peripheral face which is completely outboard of said one of said two convex separation features that protrudes inwardly from a circumferential wall of the bowl.

2. The piston of claim 1 wherein one of said two convex separation features protrudes outwardly from said dome.

3. The piston of claim 1 wherein said piston has a diameter and said flat bottom portion has a width and said width is from 2-30% of said diameter.

4. The piston of claim 1 wherein said two radial concave surface portions each have a radius of curvature of 3 mm to 50 mm.

5. The piston of claim 2 wherein said one of said two convex separation features that protrudes inwardly from a circumferential wall of the bowl further includes a nose portion.

6. The piston of claim 1 wherein said dome includes a relatively linear concentric surface angled downward from a central axis.

7. The piston of claim 3 wherein said relatively flat bottom portion defines a surface that is neither concave nor convex in at least two planes.

8. A method of operating an internal combustion engine having at least one cylinder and a piston slidably disposed within the at least one cylinder, the method comprising:

moving the piston toward a top dead center position during a compression stroke;

spraying a fuel-air mixture into a piston bowl recessed in said piston, wherein the bowl has an inner surface that defines a volume configured to receive the fuel-air mixture, the inner surface of the bowl including a flat bottom portion surrounding a central protruding dome, the flat bottom portion having a radius of curvature of equal to or greater than 1.0 meter, wherein the flat bottom portion is bounded by two radial concave surface portions which are disposed below two convex separation features for an injected fuel spray, wherein one of said two convex separation features protrudes inwardly into the bowl and is arranged to redirect said fuel-air mixture upon impact to provide additional fuel-air mixing, and wherein said one of said two convex separation features that protrudes inwardly from a circumferential wall of the bowl separates the injected fuel spray into an upper and a lower region in the combustion chamber, and wherein the piston has an upper peripheral face which is completely outboard of said one of said two convex separation features that protrudes inwardly from a circumferential wall of the bowl.

9. The method of claim 8 wherein said additional fuel-air mixing provides for a reduction in particulate matter emissions as compared to a piston bowl that does not contain said relatively flat bottom portion bounded by two radial concave surface portions which are disposed below two convex separation features.

10. The method of claim 8 wherein said piston has a diameter and said flat bottom portion has a width and said width is from 2-30% of said diameter.

\* \* \* \* \*